United States Patent
Weisenberg et al.

(10) Patent No.: US 10,473,256 B2
(45) Date of Patent: Nov. 12, 2019

(54) INVERTED FILAMENT WINDER FOR PIPELINE REHABILITATION

(71) Applicant: Sipp Technologies, LLC, Wichita, KS (US)

(72) Inventors: Kent Weisenberg, Fruit Cove, FL (US); Shane Rowan, Jacksonville, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

(21) Appl. No.: 15/975,896

(22) Filed: May 10, 2018

(65) Prior Publication Data

US 2018/0328529 A1   Nov. 15, 2018

Related U.S. Application Data

(63) Continuation-in-part of application No. 15/647,777, filed on Jul. 12, 2017, now abandoned.

(60) Provisional application No. 62/504,006, filed on May 10, 2017.

(51) Int. Cl.
*F16L 1/26* (2006.01)
*F16L 55/18* (2006.01)
*F16L 55/165* (2006.01)

(52) U.S. Cl.
CPC ........ *F16L 55/1655* (2013.01); *F16L 55/1656* (2013.01)

(58) Field of Classification Search
CPC ..... F16L 1/26; F16L 55/18; F16L 1/00; F16L 55/16; E03F 2003/065; E21D 11/00; E21D 11/10; E21D 11/40
USPC ........... 405/184, 184.2, 183.5, 154.1, 150.1, 405/150.2; 425/63, 262; 140/429, 460, 140/527.2, 819; 138/129, 98, 172, 99, 138/97, 105, 153, 152, 176, DIG. 5; 254/134.5; 285/288.2; 29/431, 451, 453, 29/402.09, 429
See application file for complete search history.

(56) References Cited

U.S. PATENT DOCUMENTS

| | | | | |
|---|---|---|---|---|
| 2,133,013 A | * | 10/1938 | Boylan | B05C 7/04 118/105 |
| 2,237,538 A | * | 4/1941 | Zublin | B21D 41/02 72/112 |
| 2,516,242 A | * | 7/1950 | Munger | B28B 19/0023 156/201 |
| 2,917,820 A | * | 12/1959 | Matheny | B28B 19/0023 264/228 |
| 2,996,085 A | * | 8/1961 | Matheny | B05C 7/02 140/2 |
| 3,126,306 A | * | 3/1964 | Sherman | B29C 63/10 156/187 |
| 3,207,617 A | * | 9/1965 | Baker | B05D 3/12 427/198 |
| 3,232,812 A | * | 2/1966 | Lorentz | B05C 7/08 156/293 |

(Continued)

*Primary Examiner* — Benjamin F Fiorello
*Assistant Examiner* — Edwin J Toledo-Duran
(74) *Attorney, Agent, or Firm* — Thomas C. Saitta

(57) ABSTRACT

A pipe lining apparatus having a resin-impregnated reinforcement filament that is helically wound onto the inner surface of a tubular first lining layer disposed within a pipe by an inverted filament winding apparatus, the apparatus having a spring-loaded, articulated frame which maintains an orbiting applicator assembly.

19 Claims, 8 Drawing Sheets

(56) References Cited

U.S. PATENT DOCUMENTS

| | | | | |
|---|---|---|---|---|
| 3,328,224 | A * | 6/1967 | Aylor | B29C 70/16 156/382 |
| 3,340,115 | A * | 9/1967 | Rubenstein | B28B 21/14 156/86 |
| 3,401,442 | A * | 9/1968 | Matheny | B28B 19/0023 425/63 |
| RE27,061 | E * | 2/1971 | Rubenstein | B28B 21/62 156/86 |
| 3,742,985 | A * | 7/1973 | Rubenstein | B28B 23/046 138/141 |
| 4,415,390 | A * | 11/1983 | Smith | B65H 81/08 156/187 |
| 4,457,236 | A * | 7/1984 | Akhmadiev | F16L 55/18 104/138.2 |
| 4,558,971 | A * | 12/1985 | David | F16L 1/038 156/175 |
| 4,865,673 | A * | 9/1989 | Shishkin | B29C 63/32 156/156 |
| 4,959,110 | A * | 9/1990 | Russell | B29C 53/72 118/105 |
| 4,968,368 | A * | 11/1990 | Moody | B29C 63/32 118/215 |
| 5,074,943 | A * | 12/1991 | Menzel | B29C 66/12421 156/195 |
| 5,240,351 | A * | 8/1993 | Holmberg | F16L 1/12 405/158 |
| 5,505,814 | A * | 4/1996 | Glaser | B23K 20/002 156/293 |
| 5,779,948 | A * | 7/1998 | Perkins | B05C 7/04 138/97 |
| 5,799,701 | A * | 9/1998 | Kitahashi | B29O 53/584 138/154 |
| 6,561,229 | B2 * | 5/2003 | Wellman | F16L 9/14 138/132 |
| 6,637,092 | B1 * | 10/2003 | Menzel | B21O 37/121 264/36.16 |
| 6,675,901 | B2 * | 1/2004 | Johnson | E21B 7/20 166/380 |
| 6,679,334 | B2 * | 1/2004 | Johnson | E21B 7/20 166/207 |
| 6,773,773 | B2 * | 8/2004 | Hauber | B29C 53/64 138/172 |
| 7,926,516 | B2 * | 4/2011 | Wilson | F16L 55/1645 138/93 |
| 8,210,226 | B2 * | 7/2012 | Zivanovic | F16L 55/1655 156/575 |
| 8,596,917 | B2 * | 12/2013 | Emmons | F16L 55/1655 138/129 |
| 8,851,098 | B2 * | 10/2014 | Thomas | B60P 3/2295 137/15.11 |
| 9,261,218 | B2 * | 2/2016 | Cheatham, III | F16L 55/163 |
| 9,709,204 | B2 * | 7/2017 | Cheatham, III | F16L 55/1283 |
| 9,784,400 | B2 * | 10/2017 | Stukerjurgen | B29C 63/32 |
| 2004/0013472 | A1 * | 1/2004 | Akimoto | F16L 55/1655 405/184.2 |
| 2008/0277012 | A1 * | 11/2008 | Anders | F16L 55/1651 138/98 |
| 2008/0277013 | A1 * | 11/2008 | Anders | F16L 55/1651 138/98 |
| 2009/0129869 | A1 * | 5/2009 | Zivanovic | F16L 55/1655 405/184.2 |
| 2009/0308475 | A1 * | 12/2009 | Stringfellow | B29C 63/343 138/98 |
| 2011/0083766 | A1 * | 4/2011 | Anders | F16L 55/1651 138/98 |
| 2011/0280665 | A1 * | 11/2011 | Emmons | F16L 55/1655 405/184.2 |
| 2013/0280424 | A1 * | 10/2013 | Jedneak | B05B 1/00 427/236 |
| 2014/0216587 | A1 * | 8/2014 | Khalifa | F16L 55/18 138/97 |
| 2014/0356529 | A1 * | 12/2014 | Goodell | F16L 55/1655 427/236 |
| 2015/0247593 | A1 * | 9/2015 | Weaver | B29O 63/32 138/129 |
| 2016/0008857 | A1 * | 1/2016 | MacNeil | B08B 9/0433 134/22.12 |
| 2016/0271876 | A1 * | 9/2016 | Lower | B29C 64/106 |
| 2017/0081834 | A1 * | 3/2017 | Benedid | F16L 55/18 |
| 2018/0266416 | A1 * | 9/2018 | Llewellyn | F04C 14/08 |

* cited by examiner

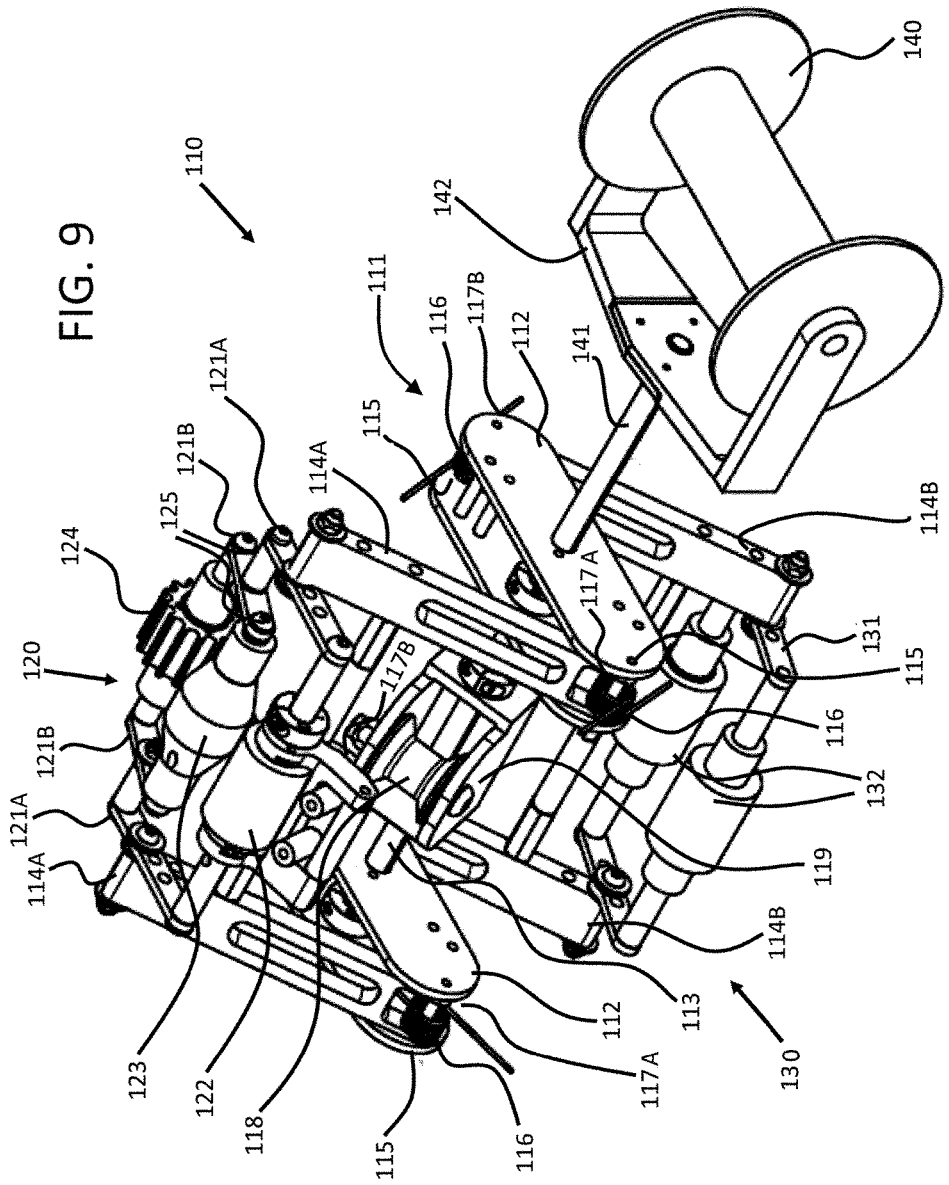

INVERTED FILAMENT WINDER FOR PIPELINE REHABILITATION

This application is a continuation-in-part of U.S. patent application Ser. No. 15/647,777, filed Jul. 12, 2017, which claims the benefit of U.S. Provisional Patent Application Ser. No. 62/504,006, filed May 10, 2017.

BACKGROUND OF THE INVENTION

This invention relates generally to methods and apparatuses for applying lining structures to internal pipe surfaces, and more particularly relates to such methods and apparatuses wherein the linings include wound reinforcement filaments applied to internal tubular surfaces, and even more particularly relates to such methods and apparatuses wherein the linings are adapted and adaptable for use in the structural repair or remediation of degraded, damaged or leaking pipes, or such linings are adapted and adaptable to improve or upgrade qualities and characteristics of pipes prior to or after use or installation. In particular, the invention relates to apparatuses and methods for applying a unidirectional or bidirectional wound filament as a component of the multi-layer lining such that the lining possesses significantly increased hoop strength, beam bending strength and significantly reduces the potential for lining creep failure.

Typically, when municipal engineers, reliability engineers, and other end users search for rehabilitation or preventative maintenance solutions for water or industrial pipes, they highly prefer a "no dig"/trenchless solution which is much cheaper than the other types of methods so the users will not be constrained by the budgets. Many end users/clients would also prefer to spend money on a long-term pipe rehabilitation that closely duplicates the design of their original pipe system. Additionally, trenchless pipe rehabilitation has little negative impacts on the surrounding areas of the pipeline system since it only needs to make a few openings on the pipes to let the lining device get into them and most of the rehabilitation process is finished underground. There are many known compositions for internal pipe linings that provide improved properties or may be used to repair degraded or damaged pipes already in use. A cured-in-place pipe (CIPP) is one of several trenchless rehabilitation methods used to repair existing pipelines. In CIPP application, a resin-saturated felt tube made of polyester, fiberglass cloth or a number of other materials suitable for resin impregnation, is inverted or pulled into a damaged pipe first, then hot water, UV light, ambient cured or steam is used to cure the resin and form a tight-fitting, joint less and corrosion-resistant replacement pipe. Another important trenchless pipe rehabilitation method is referred to by the acronym SIPP, which stands for sprayed-in-place pipe, and application of the linings typically involves single or multiple passes of equipment applying one or more polymeric material layers to the interior of the pipe to form a "pipe-in-a-pipe". There are, however, many problems or drawbacks associated with these lining methods.

While CIPP can repair a pipe with limited bend geometries, sags or deflections, this lining method cannot completely prevent wrinkling and stretching. Except for very common sizes, CIPP liners are not usually stocked and must be made specifically for each project. The liner material used for common sizes is normally a felted fabric (non-woven) or a bi-directional fabric and does not go around bends well without wrinkling and going out of round on corners. These wrinkles and defects can seriously reduce the liner strength against internal pressure loads and cause lining cracking and leaking issues. If the CIPP liner material is designed to have shorter circumference compared to the host pipe to remove wrinkles, this will create small annuluses or circumferential gaps between the liner and the host pipe into which water and/or effluent will infiltrate. In contrast, SIPP can spray polymeric lining materials directly onto pipe wall to create liners without wrinkles or folds, and this lining method can also get rid of annuluses or circumferential gaps between the liner and the host pipe via applying multi-layer liner structure (references if need). However, current SIPP technologies or any other pipeline rehabilitation technologies that utilize polymerics or more specifically thermosetting plastic materials as the structural member/barrier for the containment of pressurized fluid in an existing host pipe are constrained to the creep failure behavior of the polymeric materials under long term continuous stress. The large nonlinear stress-strain behavior of thermoplastic polyurethanes exhibits strong hysteresis, rate dependence and softening. There is no technology available in the SIPP market that can be applied to meet the structural requirements of AWWA M28 for class IV lining for pressure pipe. This holds true for many other pipe lining/pipe rehabilitation technologies as well. To overcome this issue many SIPP vendors try to increase the lining structure wall thickness which is not cost effective and it will reduce the cross-sectional diameter and the flow capacity of the rehabilitated pipes. The higher wall thickness needs more application time, which will add the potential for application error and mechanical failure while lining. Additionally, and maybe most importantly, current thermosetting polymers used in lining industries cannot be applied as one single thick membrane in large diameter pipes (diameter>10") due to the exothermic reaction and the resulting tertiary stage induced by the internal stresses in the component. This results in the requirement of application in multiple layers which means multiple passes of the lining device which equates to significant increase in time and cost. Cost is not the only detriment to applying linings in multiple passes, other potential ramifications that can lead to failure are lack of inter-coat adhesion from passing the "recoat" window of the polymeric materials, infusing debris, dust or moisture from the outside environment via being pulled into the pipe over the preceding liner coat by the umbilical.

Creep is the tendency of a solid material to move slowly or deform permanently under the influence of mechanical stresses. It can occur as a result of long-term exposure to high levels of stress that are still below the yield strength of the material. The rate of deformation (strain rate) is a function of the material properties, exposure time, exposure temperature and the applied structural load. In the initial creep stage of loading of ductile material the creep rate decreases rapidly with time and then reaches the secondary stage where the deformation rate slows down and becomes steady unless exposed to high stresses that exceeds material yielding strength. In the tertiary stage, the strain rate exponentially increases with stress because of necking phenomena or internal voiding decreases the effective area of the material. Strength is quickly lost in tertiary stage while the material's shape is permanently changed and fractures will happen finally. Due to the nature of polymeric materials SIPP liners probably can meet the requirements of structure strength for short-term period but the material strength will decrease severely and the liner will start creeping till failure after a long-term use.

For potable water applications, the internal pipe lining is required to meet the American Water Works Association (AWWA) standards and in particular the standards set out below. Class IV linings are the strongest structural pipe linings of which the internal pressure and external load resistance capabilities do not rely on the material adhesion on the host pipe and the structural support from the pipe wall. This type of lining possesses the following characteristics:

4.2.4 Class IV Linings.

4.2.4.1 Class IV linings, termed fully structural or structurally independent, possess the following characteristics:

1. The lining has a long-term hoop strength which equal to or greater than the MAOP of the pipe to be rehabilitated. This hoop strength is tested independently from the host pipe.

2. The lining has long-term resistance to external and live loads and the resistance is independent from the host pipe.

3. The lining has a short-term hoop strength which equal to or greater than all short-term loads, such as sustained and surge (vacuum and occasional and recurrent surge) pressures and live loads even if these loads are in excess of the capacity of the host pipe. This hoop strength is tested independently from the host pipe.

4.2.4.2 Class IV linings are sometimes considered to be structurally equivalent to new replacement pipe, although such linings will have markedly different properties in terms of buckling and longitudinal bending resistance than the original host pipe. These linings should be designed with adequate load resistance for all reasonable assumptions of loading conditions independent of the host pipe. By necessity, they will be of smaller internal diameters than the host pipe. However, their design should also consider practical implications to facilitate the continued service objectives of the host pipe such as the ability to provide water to service lines and mains without compromising the hydrostatic integrity of the overall lining system. (See AWWA M28, Chapter 11-3rd ed.)

4.2.4.3 Class IV linings can also be used in circumstances similar to those for Class II and III, but their use is essential for host pipes suffering from generalized external corrosion where the mode of pipe failure has been, or is likely to be, longitudinal cracking. The host pipe suffers full loss of hoop strength because of the longitudinal crack. Other catastrophic modes (e.g. spiral cracks, circumferential cracks, a leadite style joint failure blow-out) can also happen on the pipe wall where more liner structural resistance is required than traditional hole spanning structural resistance.

4.2.4.4 Some available pipe rehabilitation technologies can offer Class II, Class III and even Class IV linings, while a given lining system may be rated as Class IV for MAOP levels up to a threshold value and as a Class II and III system at higher pressures.

It is an object of this invention to provide an apparatus and methodology for producing an internally wound helical filament winding reinforcement on the interior surface of a tubular member. It is a further object to provide an apparatus and methodology for producing a multi-layer internal pipe lining structure having filament winding as a reinforcement element to increase the lining structure strength, more specifically hoop strength and to address the various problems and shortcomings of lining material creeping discussed above. It is a further object to provide an apparatus and methodology for applying a filament reinforcement comprising a UV-curable resin, a heat-curable resin or a combination thereof, and curing the filament reinforcement by exposing the filament to UV light and/or heat during the helical winding application process.

SUMMARY OF THE INVENTION

This invention provides in various embodiments an apparatus and methodology to form a pipe lining structure which is composed of one or more lining material layers and a spirally or helically wound reinforcement filament embedded on or between the layers. In a representative lining process, an elastomeric layer is applied to the interior of a pipe, then an inverted wound layer made of high-strength, settable or curable, resin-impregnated fibers or similar members in the form of a continuous filament (i.e., a string, wire, thread, cloth or bundle of fibers) is adhered to the elastomeric layer by the apparatus of the invention, and finally a second rigid layer is sprayed on top of the elastomeric layer and the winding to form the composite lining structure. The filament winding is "sandwiched" between the lining layers, and since the winding material has much higher modulus and tensile strength compared to the rigid lining material it will share and reduce the total stress on the rigid lining when applying internal pressure loads on the rehabilitated pipe. As a result of the presence of the filament winding in the lining structure, the stress on the rigid liner will decrease significantly compared to that of a rigid liner without filament winding in the same liner wall thickness. The reduction of lining structure stress can increase the working life of the liners against creep failure.

The filament winding is preferably made of fibers or similar members saturated with a UV-light-cure resin composition, although other resins, such as heat-curable resins, curable by infrared light, heating elements or the like may also be used, forming a prepreg filament that is applied to the interior of the elastomeric first layer of the lining by a filament winding apparatus advancing through the pipe bore. The apparatus comprises a rotating applicator min incorporating a filament setting element, such as a UV light or thermal element, the applicator arm being radially extensible and retractable relative to the configuration of the pipe wall, such that the end of the arm maintains close proximity to the interior of the first liner layer. The filament winding is retained on a spool and fed out through the applicator arm so as to be wound in a helical or spiral manner onto the first liner layer. The UV light or thermal element is mounted at or adjacent the end of the applicator arm and initiates resin curing on the surface of the prepreg filament, thereby creating a tacky or adhesive surface which adheres to the surface of the first liner layer to retain the filament winding in place. Additional UV lights or thermal elements may be annularly mounted to the exterior of the apparatus in order to more fully cure the resin. Alternatively, the resin may be a hybrid of UV-curable resin and heat-curable resin, such that the UV light cures the prepreg filament so as to be sufficiently rigid to withstand the weight of the wheeled apparatus as it advances in the pipe and the prepreg filament is subsequently fully cured by heating, such as by the exothermic heat produced by the curing of the rigid layer applied onto the first layer and the partially cured filament winding, or may be solely a heat-settable resin.

Alternatively expressed, the invention is an inverted filament winder apparatus adapted to apply a heat-settable filament to the inner wall of a pipe or pipe liner, said apparatus comprising: an orbiting applicator assembly comprising a compression roller, a heated compression roller and a heated spline roller; and a spool retaining a length of heat-curable filament; wherein said filament is passed onto said compression roller, said heated compression roller and said heated spline roller for application to the inner wall of a pipe or pipe liner. Furthermore, such apparatus further comprising an articulated frame having spring-loaded arm members pivotally mounted to a pair of base members, wherein said applicator assembly is mounted to said spring-loaded arm members such that said applicator assembly is outwardly biased; further comprising an orbiting centering assembly, said centering assembly being mounted to said spring-loaded arm members such that said centering assembly is outwardly biased; wherein said articulated frame and said spool are mounted onto a rotating shaft such that said articulated frame and said spool rotate at the same rate; each of said base members having a first end and a second end, and wherein said spring-loaded arm members comprise a first set of arm members mounted to said first base member end, said applicator assembly being mounted to said first set of arm members, and a second set of arm members mounted to said second base member end, and further comprising an orbiting centering assembly, said centering assembly being mounted to said second set of arm members such that said centering assembly is outwardly biased; said applicator assembly comprising a first set of brackets pivotally mounted to said arm members, said compression roller being pivotally mounted to said first set of brackets; and a second set of brackets pivotally mounted to said arm members, said heated compression roller and said heated spline roller being pivotally mounted to said second set of brackets; and/or wherein said compression roller, said heated compression roller and said heated spline roller are aligned in parallel.

BRIEF DESCRIPTION OF THE DRAWINGS

FIG. 9 is a perspective view of an alternative embodiment of the inverted filament winder apparatus.

DETAILED DESCRIPTION OF THE INVENTION

With reference to the figures, which are meant to be non-limiting as to the scope of the invention and which are not to scale, the inventive methodology and an apparatus are described in various embodiments. The term "filament" as used herein shall mean an elongated member such as a string, wire, thread, cloth strip, bundle of fibers, such as carbon fiber or fiberglass for example, or similar members, and the terms "impregnated" or "prepreg" as used herein shall mean that a filament is coated or infused with a curable resin.

Figure 1:
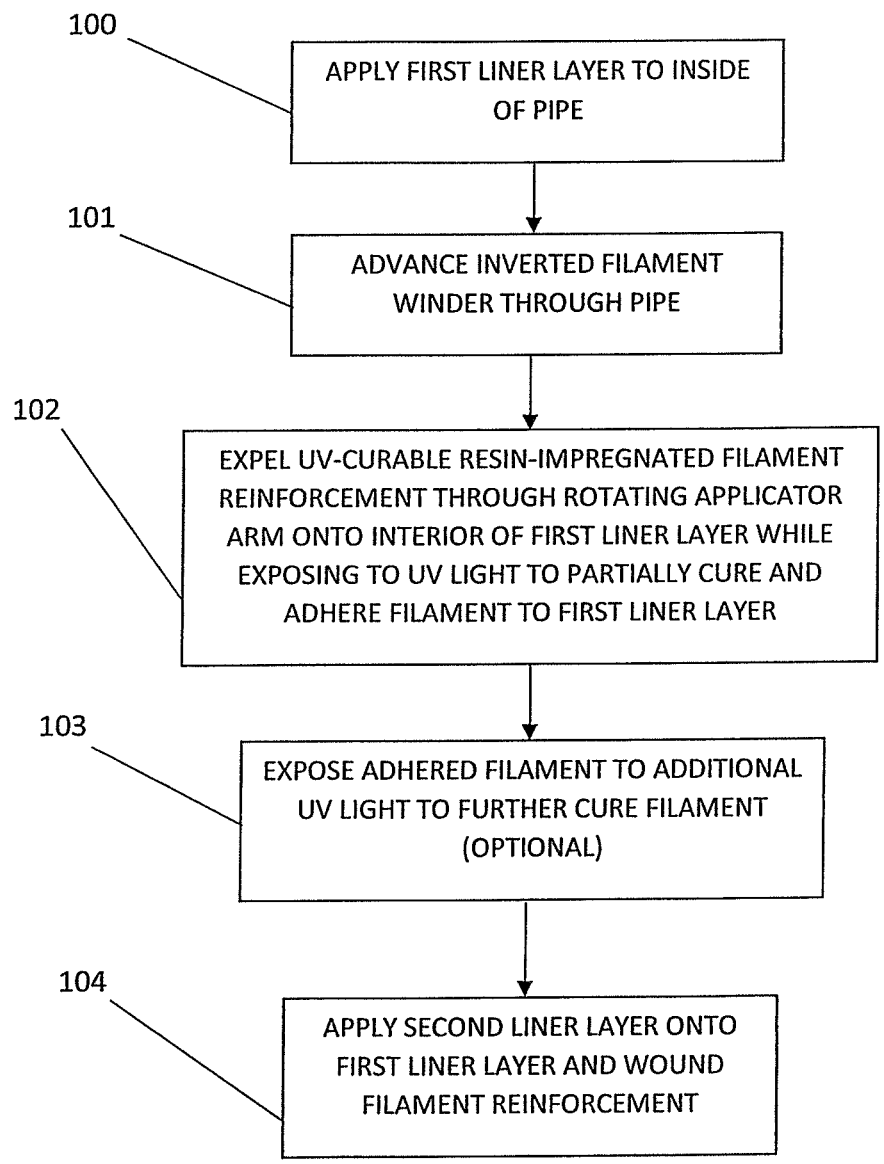
FIG. 1 is a flow chart illustrating an embodiment of the method of forming a multi-layer pipe liner comprising wound filament reinforcement.

The method comprises, in a first embodiment shown in FIG. 1, the steps of applying 100 a first liner 11 to the inside of a pipe 20, advancing 101 an inverted filament winder through the pipe 20, expelling 102 UV-curable resin-impregnated filament reinforcement 14 through a rotating applicator arm 32 onto the interior of the first liner layer 11 while exposing the filament 14 to UV light to partially cure and adhere the filament 14 to the first liner layer 11, (optionally) exposing 103 the adhered filament 14 to additional UV light to further cure the filament 14, and applying 104 a second liner layer 12 onto the first liner layer 11 and the wound filament reinforcement 14.

Figure 2:
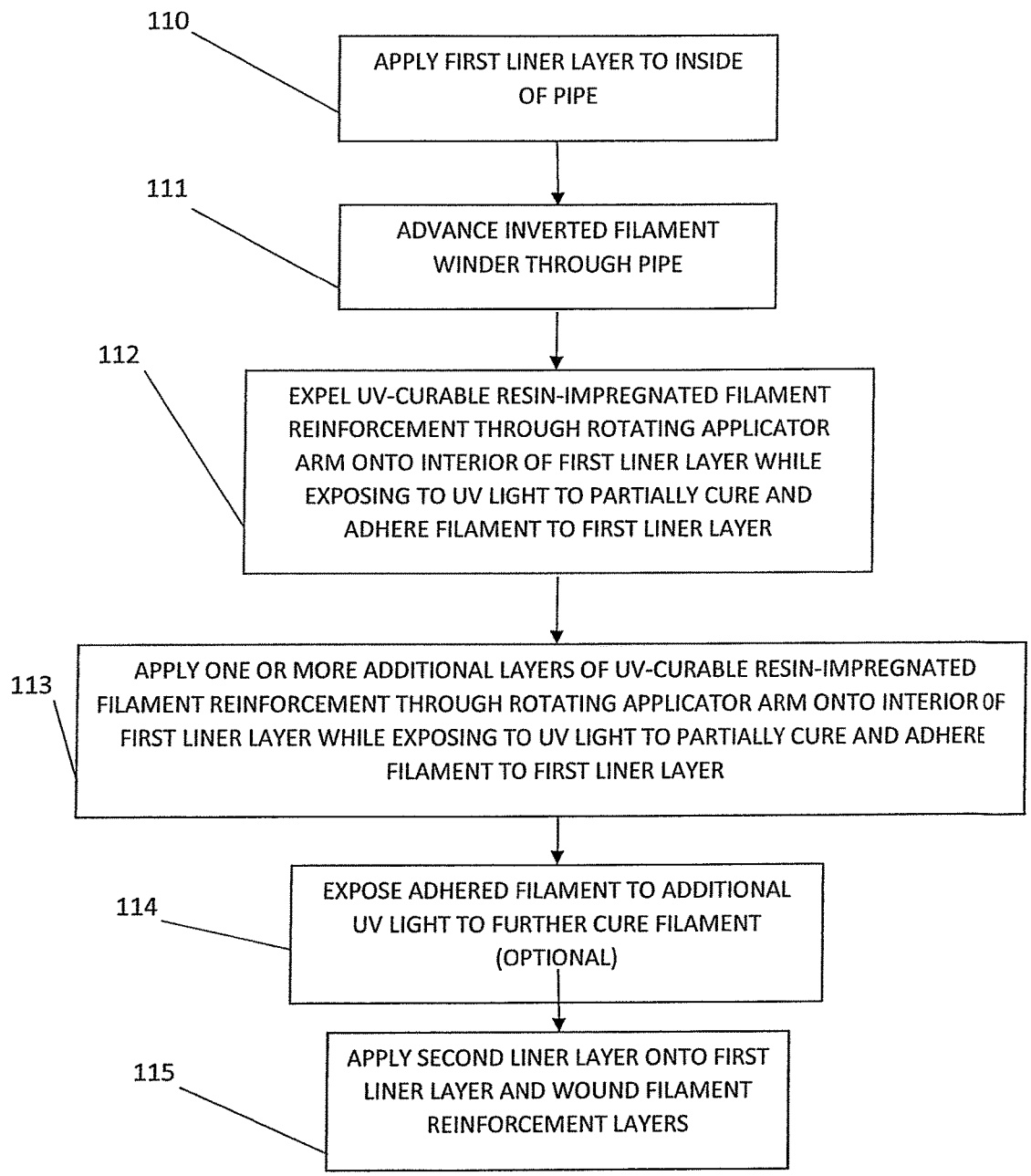
FIG. 2 is a flow illustrating a second embodiment of the method of forming a multi-layer pipe liner comprising wound filament reinforcement, wherein plural layers of wound filament reinforcement are applied.
Figure 3:
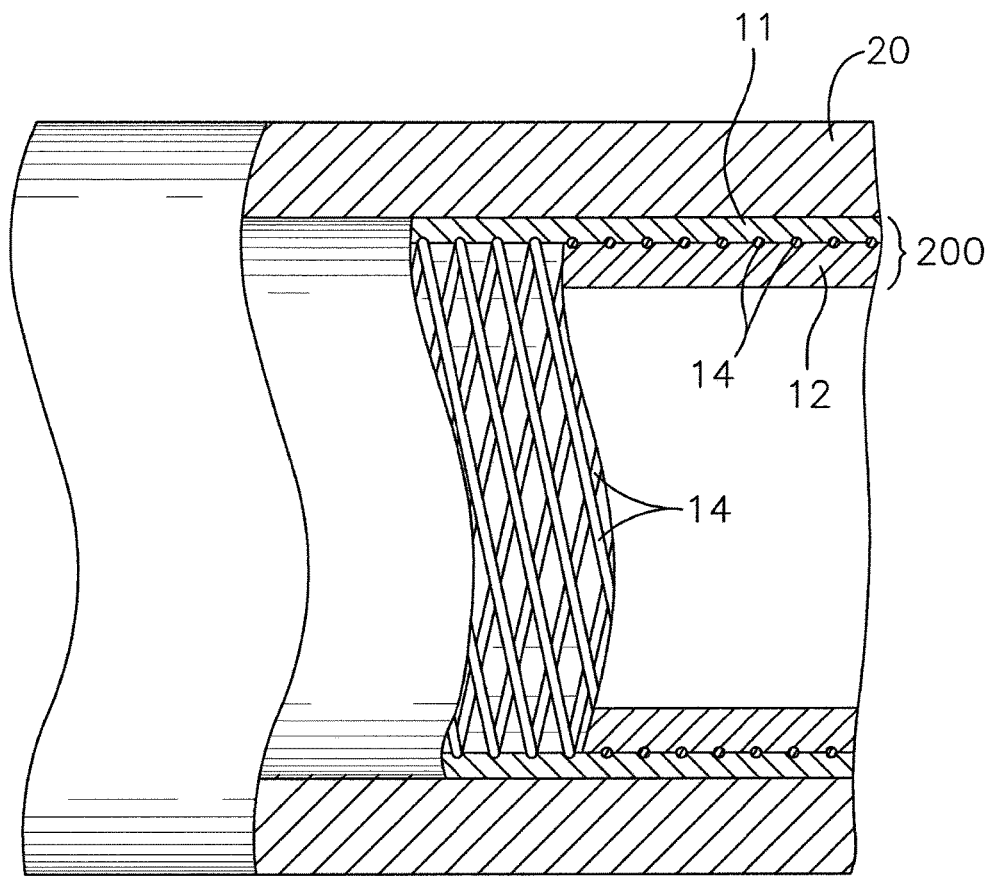
FIG. 3 is a partially exposed, partially cross-sectional view of a multi-layer pipe liner in place within a pipe.
Figure 4:
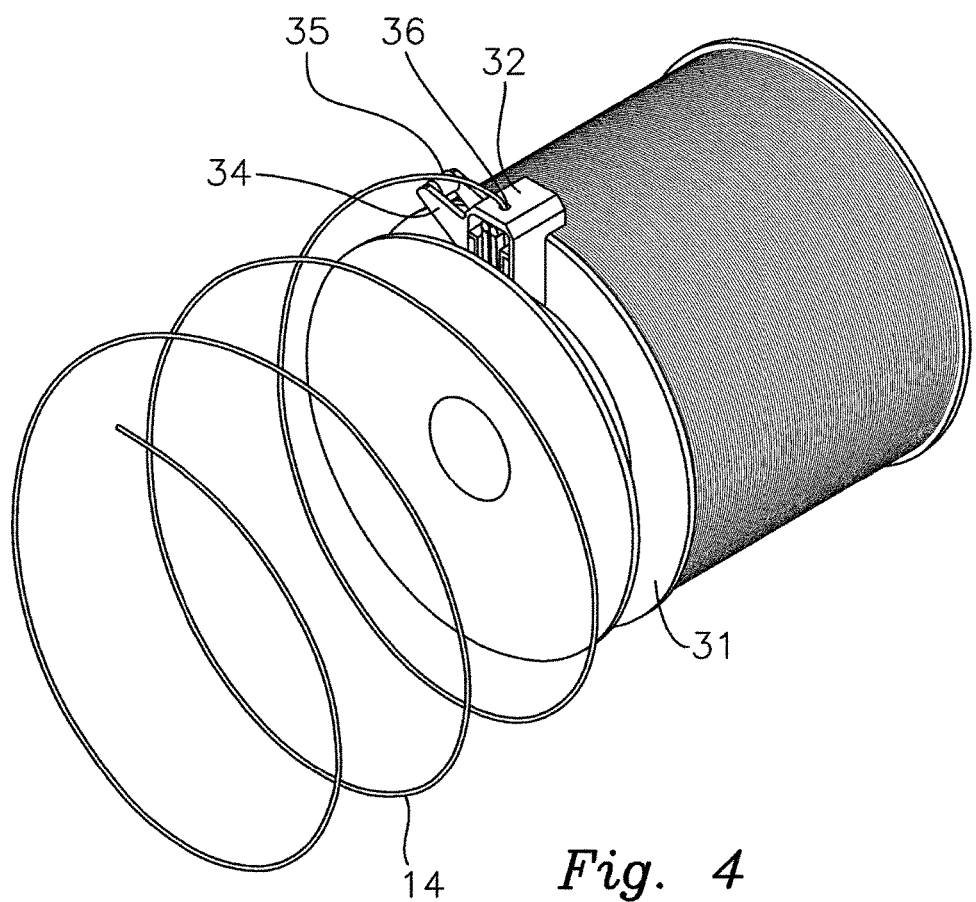
FIG. 4 is an illustration of an embodiment of the spool and applicator arm of the inverted filament winder apparatus, the spool being loaded with prepreg filament.
Figure 5:
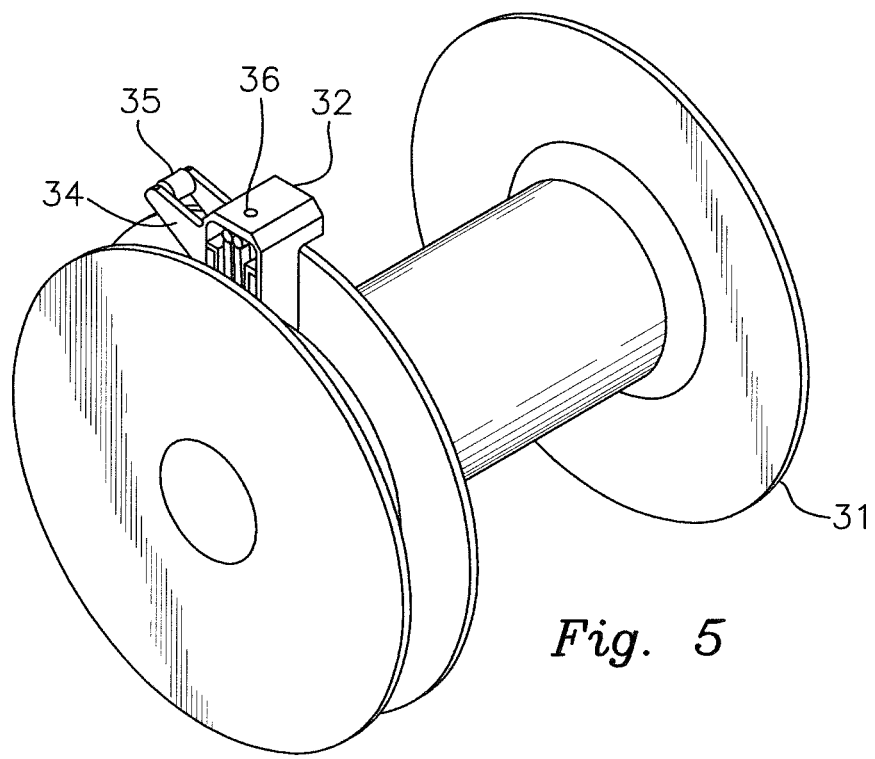
FIG. 5 is an illustration similar to FIG. 4 of an unloaded spool.
Figure 6:
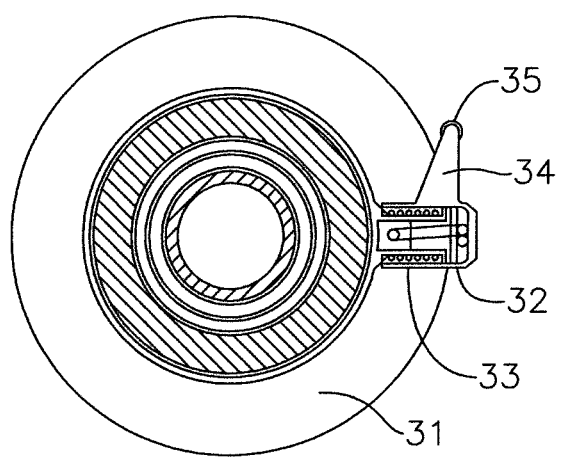
FIG. 6 is a cross-sectional end view of the spool and applicator arm of FIG. 4, taken along line 6-6.
Figure 7:
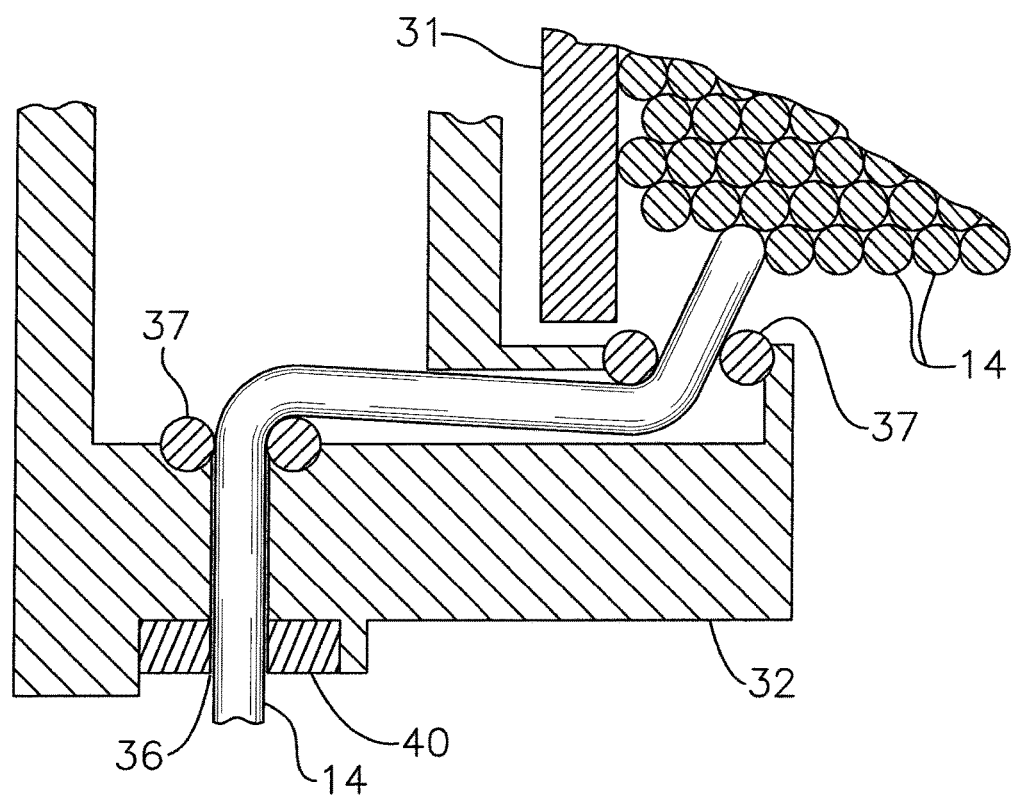
FIG. 7 is a partial cross-sectional view of the spool and applicator arm of FIG. 4.
Figure 8:
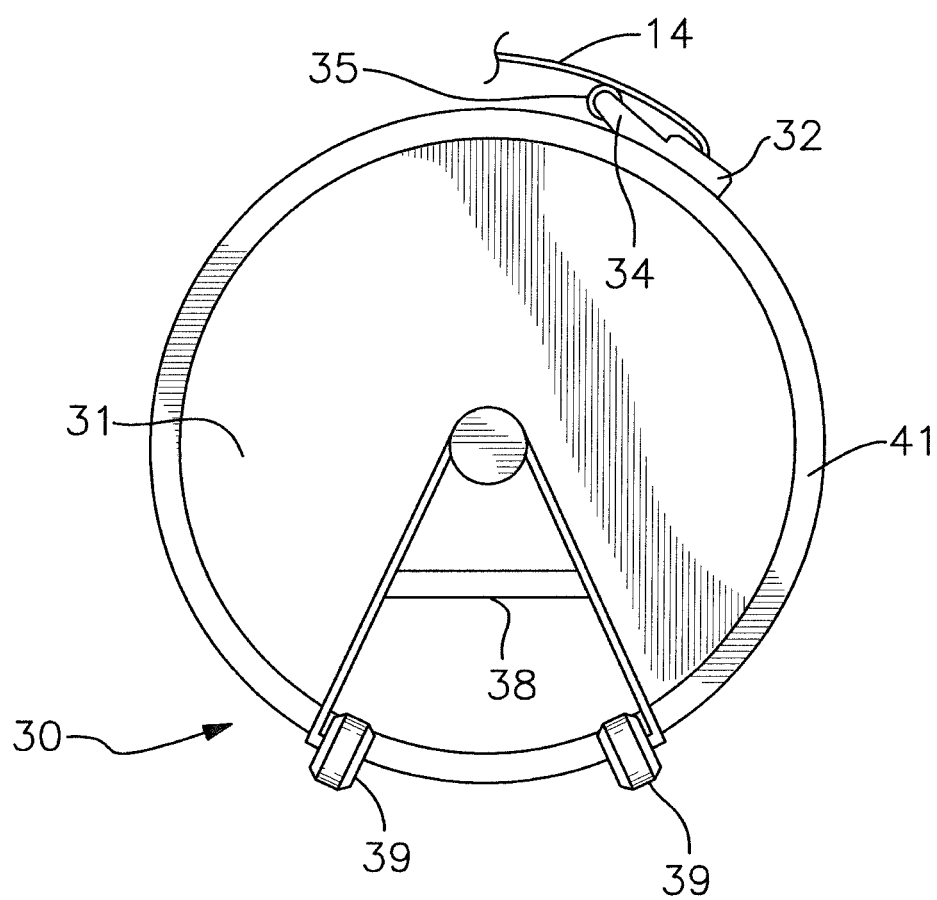
FIG. 8 is an end view of the inverted filament winder apparatus.

The method, in a second embodiment shown in FIG. 2, comprises the steps of applying 110 the first liner 11 to the inside of the pipe 20, advancing 111 the inverted filament winder through the pipe 20, expelling 112 UV-curable resin-impregnated filament reinforcement 14 through the rotating applicator arm 32 onto the interior of the first liner layer 11 while exposing the filament 14 to UV light to partially cure and adhere the filament 14 to the first liner layer 11, applying 113 one or more additional layers of UV-curable resin-impregnated filament reinforcement 14 through the rotating applicator arm 32 onto the interior of the first liner layer 11 while exposing to UV light to partially cure and adhere filament 14 to the first liner layer 11, (optionally) exposing 114 the adhered filament 14 to additional UV light to further cure the filament 14, and applying 115 the second liner layer 12 onto the first liner layer 11 and the wound filament reinforcement 14.

Furthermore, it is also to be understood that the method may consist of utilizing the inverted filament winding apparatus to deposit the UV-curable resin impregnated filament 14 in helical fashion onto the interior surface of any tubular member with simultaneous curing of the resin.

In a non-limiting representative embodiment, the method produces a multi-layer or laminate pipe liner 200 with filament winder reinforcement 14 disposed or embedded between two liner layers 11/12. As a representative and non-limiting example, the liner 200 may comprise a first or outer tubular layer 11 composed of a low modulus, high elongation, flexible, elastomeric material disposed within and bonded to a pipe 20, a second or inner tubular layer 12 disposed within and bonded to the first layer 11 and which is composed of a rigid, durable, thermoset polymeric material, and one or more wound resin-impregnated (prepreg) filaments 14 possessing high-strength (>4500 MPa), high modulus (>200 GPa), low elongation (<2%) that is sandwiched between the first and second layers 11/12.

Before starting the pipe lining process for in-situ pipes 20 being repaired or lined, the pipe 20 should be cleaned using conventional methods, such as blasting and pigging, etc. The pipe 20 is then lined internally, preferably by spray application, with a polymeric material to form the first or elastomeric liner layer 11. The first liner layer 11 is most preferably approximately 1-12 mm in thickness upon curing, with the optimal thickness being determined by pipe diameter. The first layer 11 mechanically bonds to the inner surface of the pipe or conduit 20, which may be composed of metal, polymer or concrete.

The prepreg filament winding 14 is then applied to the interior of the first layer 11 using an inverted filament winding apparatus 30, as illustrated in FIGS. 4-8. The apparatus 30 is "inverted" in the sense that the filament 14 is wound onto the interior of a tubular member as opposed to being wound externally onto the exterior of a cylindrical or tubular member. The filament winding apparatus 30 comprises a non-rotating carriage or frame 38 that is typically provided a transport assembly having with wheels, rollers, sleds or the like 39, such that the winding apparatus 30 may be pulled, pushed or powered through the pipe 20 with the wheels 39 remaining beneath the carriage 38. The winding apparatus 30 further comprises a spool 31 which retains the uncured prepreg filament 14, the spool 31 preferably oriented with its axis of rotation parallel to the axis of travel of the winding apparatus 30 through the pipe 20 in order to prevent the imparting torsional stresses on the filament 14 as it is unwound from the spool 31.

In one exemplary embodiment, the filament 14 is impregnated with the UV-curable resin, or a hybrid resin comprising a UV-curable resin component and a heat curable resin component (such that exothermic heat resulting from the curing of the rigid layer 12 performs the final curing of the resin-impregnated filament 14 after the initial curing by exposure to UV light), prior to disposition of the prepreg filament 14 on the spool 31. Alternatively, the apparatus 30 may be constructed such that the resin is coated or infused on or into the filament 14 within the apparatus 30 prior to delivery of the filament 14 through the applicator arm 32.

The winding apparatus 30 further comprises an applicator arm 32 extending radially outward beyond the circumference of the spool 31, the applicator arm 32 being powered for rotational movement about a centrally located axis parallel to the axis of travel of the winding apparatus 30 through the pipe 20. A follower arm 34 and follower roller 35 extend generally laterally from the end of the applicator arm 32, such that as the filament 14 is expelled through the aperture 36 at the end of the applicator arm 32, the follower roller 35 passes over the filament 14 to press it against the inner surface of the first liner layer 11 for better adhesion. The applicator arm 32 is structured to include an extension/retraction mechanism 33, i.e., a structure that allows for the lengthening and shortening of the applicator arm 32 in the radial direction, the extension/retraction mechanism 33 preferably being automatically responsive to changes in the interior diameter of the interior pipe wall 20 or any other inner surface, such as a mechanism comprising the telescoping structure and spring assembly shown in FIG. 6, a gas cylinder, equivalent mechanical constructs, or the like. This allows the follower roller 35 and the applicator arm 32 to adapt to imperfections in the interior pipe wall 20 and/or in the inner surface of the first liner layer 11 by moving radially inward or outward as needed. Powered feed rollers 37 are disposed within the applicator arm 32 to pull the filament 14 from the spool 31 and deliver it through the applicator arm aperture 36.

A UV light 40 is positioned on, at or adjacent the end of the applicator arm 32 such that the prepreg filament winding 14 is exposed to UV light as it is expelled from the applicator arm 32 and is pressed onto the first liner layer 11 by the follower roller 35. This exposure initiates curing or partially cures the UV-curable resin present in the filament 14, producing a tacky or temporarily adhesive surface that adheres and bonds the filament winding 14 to the first liner layer 11. With this methodology, apparatus and composition, the pre-cured filament 14 being deposited remains in a pliable, easily-handled state, as opposed to the stiff wire reinforcement required in earlier systems, the stiffness of the wire being necessary to maintain it in the expanded helical configuration. In one embodiment, an annular ring of UV lights 41 are positioned on the apparatus 30 such that additional curing of the filaments 14 now affixed to the inner wall of the first layer 11 occurs as needed. In another embodiment, the resin utilized for the filaments 14 is a hybrid resin comprising a UV-curable resin component and a heat curable resin component, such that final curing of the filaments 14 occurs by "shadow" curing when the second layer 12 is applied, the heat from the exothermic curing reaction of the second layer 12 providing the heat to cure the heat-curable resin and rigidify the wound filament 14.

The filament 14 is spirally or helically wound onto the first layer 11. The pitch and spacing of the wound filament 14 is determined by the advancement speed of the filament winder apparatus 30 and the rotational speed of the applicator arm 32, such that the method may produce a tightly spaced spiral or a more open spiral. In addition, multiple passes may be made through the pipe 20, or multiple filament winder apparatuses 30 may be utilized to deliver a plurality of helical windings 14. The additional windings 14 may be deposited between or cross over the first winding 14.

Since it is required to wind the filament 14 inside the host pipe 20 during the application process, the filament 14 is preferably retained on a spool 31 and stored in the apparatus 30. In this way, the filament 14 can be unwound directly from the rotatable spool 31 and adhered onto the elastomeric first liner 11 following linear and rotational motion of applicator arm 32 to create the helical filament shape. Alternatively, the filament 14 may be stored on a spool external to the pipe 20 and delivered to the applicator arm 32, in which case the winding direction of the filament 14 must be kept alternating in the application process, i.e., the filament 14 will be wound in one direction for a certain amount of rotations, then it will be wound in the opposite rotating direction but move in the same lining direction. The alternating winding motions can also avoid the filament 14 from winding and accumulating on the winding apparatus 30. The pitch distance (typically 0.5"-16") of the wound filament 14 and the size/diameter (typically 0.02"-0.50") of the filament 14 will usually depend on the host pipe 20 diameter and the internal working pressure—based on the thickness of the liner 200 vs. the surface area of the unreinforced liner 200 that can resist the stress between the reinforcement filament 14 pitches at the given pressure.

An alternative embodiment of the filament winding apparatus 110 illustrated in FIG. 9. The transport assembly and wheels 39 are not shown for clarity purposes, but it is to be understood that the apparatus 110 as illustrated is adapted to be transported through a pipe as previously discussed. The apparatus 110 comprises an articulated, rotating frame or assembly 111, which presents a generally Z-shaped configuration when viewed from either axial end. The articulated frame 111 comprises a pair of axially-separated base members 112 which are mounted to a rotatable shaft 141, powered by a motor or similar means (not shown), such that rotation of the shaft 113 results in rotation of the articulated frame 111. A pair of spring-loaded arm members 114 are joined with a pivot joint 115 to each base member 112, one on each base member end 117. A spring member 116 is disposed in each pivot joint 115, such that the free ends of the arm members 114 are outwardly biased at all times. A first set of axially-separated arm members 114A are disposed in parallel so as to extend from base member first ends 117A in a first direction, and a second set of axially-separated arm members 114B are disposed in parallel so as to extend from the base member second ends 117B in a second and opposite direction.

An orbiting applicator assembly 120 is mounted to the free or outer ends of axially-separated arm members 114A and an orbiting centering assembly 130 is mounted to the free or outer ends of axially-separated arm members 114B. The term "orbiting" references that the applicator assembly 120 and the centering assembly 130 rotate circumferentially within the pipe or pipe liner about the central axis defined by the shaft 141.

The applicator assembly 120 comprises a first set of brackets 121A pivotally mounted onto the free ends of the arm members 114A, the brackets 121A extending transverse to the central axis. A compression roller 122 is mounted to extend between the brackets 121A, the rotational axis of the compression roller 122 being in parallel to the central axis. A second set of brackets 121B is pivotally mounted to the first set of brackets 121A on the ends opposite the compression roller 122. A heated compression roller 123 is mounted to extend between the second set of brackets 121B, the rotational axis of the heated compression roller 123 being in parallel to the central axis and to the rotational axis of the compression roller 122.

A heated spline roller 124 is mounted to extend between the second set of brackets 121B, the rotational axis of the heated spline roller 123 being in parallel to the central axis and to the rotational axis of the compression roller 122 and the heated compression roller 123. The splines of the heated spline roller 123 are axially oriented and may consist of alternating ridges and valleys, as shown. Alternatively, the outer surface of the heated spline roller 124 could be provided with differing physical structures, such as for example, curved ridges, projections in the form of posts or the like, bumps, etc., and the term "spline roller" shall be taken to include any such physical surface variations. The compression roller 122, the heated compression roller 123 and the heated spline roller 124 are preferably free-spinning, and as such are rotated upon contact with the interior wall of a pipe or pipe liner. The pivotal mountings of the two sets of brackets 121A/B allow the compression roller 122, the heated compression roller 123 and the heated spline roller 124 conform to the curvature of the pipe or pipe liner as they are rotated circumferentially within the pipe to apply a filament, which is composed of a heat-settable material and preferably in the form of a strip or ribbon. Temperature probes 125 may be provided in association with the heated compression roller 123 and the heated spline roller 124 to provide data indicating whether a minimum desired temperature is being maintained during the winding operation.

The compression roller 122 is preferably a machined member composed of a thermoplastic material. The heated compression roller 123 is preferably a machined member composed of a copper or similar highly heat conductive material, having a spheroid geometry and embedded heating elements. The heated spline roller 124 is also preferably a machined member composed of a copper or similar highly heat conductive material with embedded heating elements.

The orbiting centering assembly 130 serves to center the apparatus 110 within the pipe or pipe liner during the winding operation, and comprises in the embodiment shown a pair of counter rollers 132 pivotally mounted to a pair of brackets 131, the brackets 131 extending transverse to the central axis and pivotally mounted to the outer or free ends of the arm members 114B. The outward pressure applied to the centering assembly 130 by the spring members 115, combined with the outward pressure applied to the applicator assembly 120, cause both assemblies 120/130 to be seated against the interior wall of the pipe or pipe liner.

A spool bracket 142 is mounted onto the shaft 141, the spool bracket 142 retaining a filament spool 140 that is adapted to retain a length of filament to be applied to the pipe or pipe liner, such as a heat-lettable pre-impregnated carbon fiber member. A transition filament pulley 118 is mounted to a pulley bracket 119 and affixed to the central shaft 141. The spool bracket 142, filament spool 140 and transition filament pulley 118 are mounted so as to rotate with the shaft 141, in concert with the applicator assembly 120.

With this structure, filament from the spool 140 is passed over the transition filament pulley 118 and onto the compression roller 122, the transition filament pulley 118 altering the filament from an axial path to a radial path. The compression roller 122 presses the filament against the interior wall of the pipe or pipe liner. As rotation of the articulated frame 111 continues, the heated compression roller 123 is then brought into contact with the filament, whereby the filament is heated to melt or soften the heat-settable resin. As rotation continues, the heated splined roller 124 is next brought into contact with the filament. The physical surface structures of the heated spline roller 124 press the filament securely onto or into the pipe or pipe liner, such that upon cooling and setting, the filament is firmly adhered to the pipe or pipe liner wall. The surface structure of the heated spline roller 124 is such that the filament is not lifted from the inner wall by adhesion and liquid resin is not collected on the roller 124.

The embodiment as shown may be altered to utilize a UV-curable filament, in which case the heated compression roller 122 may be removed, or in the alternative constructed so as to be non-heated, and the heated spline roller 124 may be constructed so as to be non-heated. A UV-light source would be provided on the applicator assembly 120 to initiate curing of the UV-curable filament. Alternatively still, a combination of UV-curable and heat-curable resins may be utilized, in which case the apparatus 110 would be provided with thermal elements and UV-light elements.

A preferred curing or setting time for the filament winding 14 is in the range of 0.1 to 3 seconds depending on the pipe size and the speed of the rehabilitation lining process. After the helically wound filament 14 is sufficiently cured, the rigid lining material layer 12 is then sprayed on top of the elastomeric layer 11 and the filament winding 14. The second layer 12 preferably has a snap cure rate of approximately 3 to 300 seconds and a final or full cure rate or 1 hour to 24 hours and is applied at a thickness of approximately 3 to 100 mm, dependent on the host pipe size.

The application of elastomeric layer 11, filament winding 14 and rigid layer 12 can be finished in the same lining pass with an apparatus comprising the necessary functionalities or in separate passes by separate apparatuses, but the winding of filament 14 must be finished before the rigid lining application in the same pass. The rigid layer 12 is applied in the same lining pass right after the reinforcement fiber is at least substantially fixed and cured on the elastomeric layer 11.

It is understood that equivalents and substitutions to some of the elements and steps disclosed above may be obvious to those of skill in the art, and therefore the true scope and definition of the invention is to be as set forth in the following claims.

We claim:

1. An inverted filament winder apparatus adapted to apply a filament to the inner wall of a pipe or pipe liner, said apparatus comprising:
   an articulated frame comprising a pair of base members mounted to a rotatable shaft, each of said base members comprising a first end and a second end;
   a first set of spring-loaded arm members pivotally mounted to the first ends of said base members, and a second set of spring-loaded arm members pivotally mounted to the second ends of said base members;
   said first set of spring-loaded arm members extending from said base members in a first direction and said second set of spring-loaded arm members extending from said base members in a second and opposite direction;

an orbiting applicator assembly comprising a compression roller, said orbiting applicator assembly mounted to said first set of spring-loaded arm members such that said orbiting applicator assembly is outwardly biased;

an orbiting centering assembly, said orbiting centering assembly mounted to said second set of spring-loaded arm members such that said orbiting centering assembly is outwardly biased;

said orbiting applicator assembly and orbiting centering assembly being positioned on opposite sides of said rotatable shaft;

a spool retaining a length of heat-curable filament;

wherein said filament is passed onto said compression roller for application to the inner wall of a pipe or pipe liner.

2. The apparatus of claim 1, wherein said orbiting applicator assembly is pivotally mounted to said first set of spring-loaded arm members and said orbiting centering assembly is pivotally mounted to said second set of spring-loaded arm members.

3. The apparatus of claim 2, wherein said orbiting centering assembly comprises a pair of counter rollers mounted to a pair of brackets, said pair of brackets being pivotally mounted to said second set of spring-loaded arm members.

4. The apparatus of claim 1, wherein the combination of said first set of spring-loaded arm members, said base members and said second set of spring-loaded arm members presents a Z-shaped configuration.

5. The apparatus of claim 1, wherein said rotatable shaft defines an axis and said pair of base members are separated axially along said rotatable shaft.

6. The apparatus of claim 1, wherein said spring-loaded arm members of said first set of spring-loaded arm members are disposed in parallel to each other and wherein spring-loaded arm members of said second set of spring-loaded arm members are disposed in parallel to each other.

7. The apparatus of claim 1, wherein said spring-loaded arm members of said first set of spring-loaded arm members extend at an acute angle from said base members and wherein spring-loaded arm members of said second set of spring-loaded arm members extend at an acute angle from said base members.

8. An inverted filament winder apparatus adapted to apply a filament to the inner wall of a pipe or pipe liner, said apparatus comprising:

an articulated frame comprising base members mounted to a rotatable shaft, each of said base members comprising at least one free end;

a first set of spring-loaded aim members pivotally mounted to the free ends of two of said base members, and a second set of spring-loaded arm members pivotally mounted to the free ends of two of said base members;

said first set of spring-loaded arm members extending from said base members in a first direction and said second set of spring-loaded arm members extending from said base members in a second and opposite direction;

an orbiting applicator assembly comprising a compression roller, said orbiting applicator assembly mounted to said first set of spring-loaded arm members such that said orbiting applicator assembly is outwardly biased;

an orbiting centering assembly, said orbiting centering assembly mounted to said second set of spring-loaded arm members such that said orbiting centering assembly is outwardly biased;

said orbiting applicator assembly and orbiting centering assembly being positioned on opposite sides of said rotatable shaft;

a spool retaining a length of heat-curable filament;

wherein said filament is passed onto said compression roller for application to the inner wall of a pipe or pipe liner.

9. The apparatus of claim 8, wherein said orbiting applicator assembly is pivotally mounted to said first set of spring-loaded arm members and said orbiting centering assembly is pivotally mounted to said second set of spring-loaded arm members.

10. The apparatus of claim 9, wherein said orbiting centering assembly comprises a pair of counter rollers mounted to a pair of brackets, said pair of brackets being pivotally mounted to said second set of spring-loaded arm members.

11. The apparatus of claim 8, wherein the combination of said first set of spring-loaded arm members, said base members and said second set of spring-loaded arm members presents a Z-shaped configuration.

12. The apparatus of claim 8, wherein said rotatable shaft defines an axis and said base members are separated axially along said rotatable shaft.

13. The apparatus of claim 8, wherein said spring-loaded arm members of said first set of spring-loaded aim members are disposed in parallel to each other and wherein spring-loaded arm members of said second set of spring-loaded aim members are disposed in parallel to each other.

14. The apparatus of claim 8, wherein said spring-loaded arm members of said first set of spring-loaded arm members extend at an acute angle from said base members and wherein spring-loaded arm members of said second set of spring-loaded arm members extend at an acute angle from said base members.

15. An inverted filament winder apparatus adapted to apply a filament to the inner wall of a pipe or pipe liner, said apparatus comprising:

an articulated frame comprising a pair of base members mounted to a rotatable shaft, each of said base members comprising a first end and a second end, wherein said rotatable shaft defines an axis and said pair of base members are separated axially along said rotatable shaft;

a first set of spring-loaded arm members pivotally mounted to the first ends of said base members, and a second set of spring-loaded arm members pivotally mounted to the second ends of said base members;

said first set of spring-loaded arm members extending from said base members in a first direction and said second set of spring-loaded arm members extending from said base members in a second and opposite direction;

an orbiting applicator assembly comprising a compression roller, said orbiting applicator assembly pivotally mounted to said first set of spring-loaded arm members such that said orbiting applicator assembly is outwardly biased;

an orbiting centering assembly, said orbiting centering assembly pivotally mounted to said second set of spring-loaded arm members such that said orbiting centering assembly is outwardly biased;

said orbiting applicator assembly and orbiting centering assembly being positioned on opposite sides of said rotatable shaft;

wherein the combination of said first set of spring-loaded arm members, said base members and said second set of spring-loaded arm members presents a Z-shaped configuration;

a spool retaining a length of heat-curable filament;

wherein said filament is passed onto said compression roller for application to the inner wall of a pipe or pipe liner.

16. The apparatus of claim 15, wherein said spring-loaded arm members of said first set of spring-loaded arm members are disposed in parallel to each other and wherein spring-loaded arm members of said second set of spring-loaded arm members are disposed in parallel to each other.

17. The apparatus of claim 15, wherein said spring-loaded arm members of said first set of spring-loaded arm members extend at an acute angle from said base members and wherein spring-loaded arm members of said second set of spring-loaded arm members extend at an acute angle from said base members.

18. The apparatus of claim 16, wherein said spring-loaded arm members of said first set of spring-loaded arm members extend at an acute angle from said base members and wherein spring-loaded arm members of said second set of spring-loaded arm members extend at an acute angle from said base members.

19. The apparatus of claim 15, wherein said orbiting centering assembly comprises a pair of counter rollers mounted to a pair of brackets, said pair of brackets being pivotally mounted to said second set of spring-loaded arm members.

* * * * *